April 8, 1924.
C. W. SPAUGH
1,489,465
METAL TOP FASTENER
Filed Sept. 16, 1922
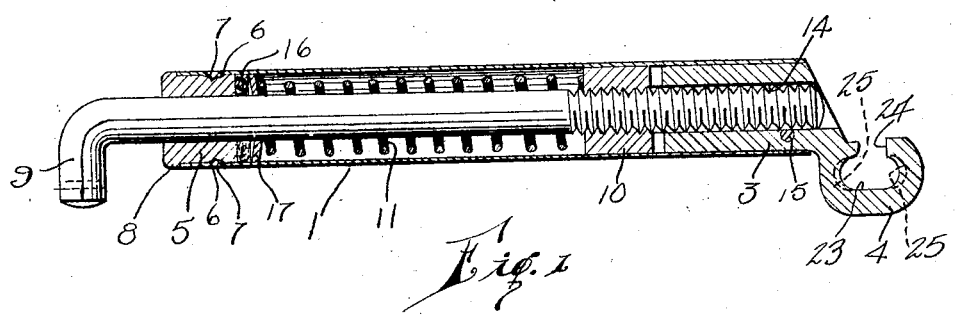
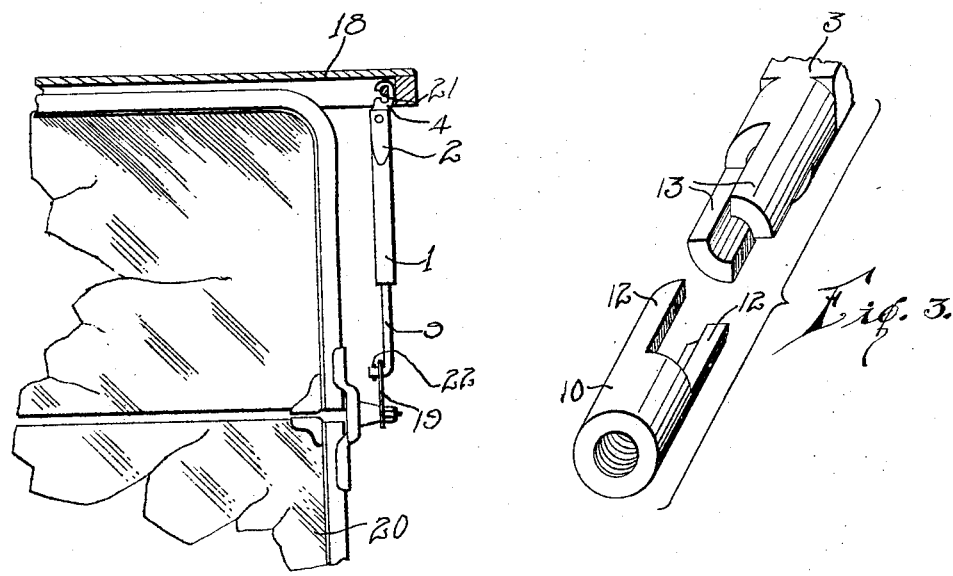
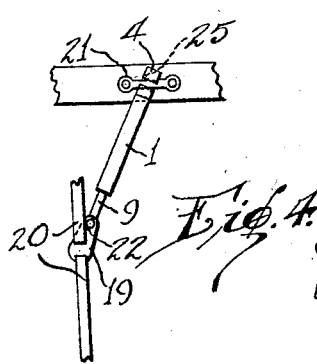
INVENTOR
C. W. Spaugh
BY
ATTORNE Patented Apr. 8, 1924.

1,489,465

UNITED STATES PATENT OFFICE.

CLYDE W. SPAUGH, OF DURHAM, OKLAHOMA.

METAL TOP FASTENER.

Application filed September 16, 1922. Serial No. 588,716.

*To all whom it may concern:*

Be it known that I, CLYDE W. SPAUGH, a citizen of the United States, and a resident of Durham, in the county of Roger Mills and State of Oklahoma, have invented a new and useful Improvement in Metal Top Fasteners, of which the following is a full, clear, and exact description.

My invention relates to improvements in metal top fastener for automobile tops, and it consists in the combinations constructions and arrangements herein described and claimed.

An object of my invention is to provide a metal top fastener which may be readily secured to the front end of an automobile top and to the windshield, whereby the top is held in adjusted position.

A further object of my invention is to provide a device of the type described which permits a slight movement between the top and the windshield, but which prevents any rattling of the top.

A further object of my invention is to provide a device of the type described which has a neat appearance, and which consists of few parts and is inexpensive to manufacture.

A further object of my invention is to provide a device of the type described, which is simple in construction and is durable and efficient for the purpose intended.

Other objects and advantages will appear in the following specification, and the novel features of the invention will be particularly pointed out in the appended claims.

My invention is illustrated in the accompanying drawings, forming part of this application in which Fig. 1 is a longitudinal section through the device, Fig. 2 is a front elevation of the device as shown operatively applied to a car, Fig. 3 is a perspective view of a portion of the device, and Fig. 4 is a side elevation of the devce.

In carrying out my invention, I provide an outer cylindrical casing 1 which is squared at one end as at 2 and is adapted to receive the square shank 3 of a hook 4. A sleeve 5 is disposed in the cylindrical end of the casing and is provided with recesses 6 into which the casing is bent at 7, whereby the sleeve is rigidily locked in place. It will be noted from Fig. 1 that the sleeve 5 has a flange 8 which bears against the end of the casing 1.

An L-shaped bolt 9 is slidably received in the sleeve 5 and is threaded in a sleeve 10 which is slidably disposed in the casing 1. A spring 11 is disposed between the sleeve 5 and the sleeve 10 and yieldingly holds the sleeve 10 in engagement with the shank 3. To prevent the sleeve 10 from rotating with the bolt 9 when the latter is turned, I provide the sleeve with lugs or teeth 12 which are adapted to engage with teeth 13 of the shank 3. It will therefore be noted that the sleeve 10 is adapted to move toward and away from the shank 3, but is prevented from rotating with respect to the shank. The bore 14 of the shank 3 is large enough to loosely receive the bolt 9. A rivet 15 secures the shank 3 to the casing 1.

The device may be readily oiled by pouring the oil into the bore 14. When applied to a car, the device assumes a vertical position, whereby the oil will readily flow into the casing 1 and effectually lubricate the spring 11. A felt washer 16 and a concave metal washer 17 are disposed adjacent to the sleeve 5 and prevent the oil from passing thereby. The washer 17 engages with the washer 16 only at the peripheral margin thereof, thereby permitting more flexibility to the felt washer. This construction permits the felt washer to stop all oil from passing thereby. The spring 11 bears against the washer 17.

From the foregoing description of the various parts of the device, the operation thereof may be readily understood. The device takes the place of the ordinary strap which connects the top 18 to the hook 19. The present device is constructed so as to fit a Ford automobile, although it is obvious that with slight alterations it may fit many different types of cars. In the Ford automobile, the hook 19 is carried by the windshield 20 and is connected by a strap (not shown) to an eyelet 21 which is carried by the top 18.

In applying the device to the car, the hook 4 is disposed in the eyelet 21, and the bolt 9 is rotated so as to extend to the hook 19. The bent portion of the bolt engages with the hook and is held in place by a cotter pin 22. It should be noted that one of these devices is disposed on each side of the windshield 20. As heretofore stated, the devices will prevent the rattling of the top which is customary with the ordinary fastening devices, and still permits the top 18 to move with respect to the windshield 20 in case the car hits a very uneven place in the road. The device makes a neat appearance and is built strongly. The device is simple in construction and is durable and efficient for the purpose intended.

It will be noted that the eyelet 21 is the ordinary eyelet, usually employed in the Ford car, as is also the windshield and top. These parts form no part of my invention, except in so far as they cooperate with the fastener. It is obvious that the eyelet may be round in cross section or of any other shape or size desired. The device is moved into a position parallel with the top 18 so as to permit the opening 24 to receive the eyelet 21. The device is then swung downwardly whereupon the eyelet will be received in the recess 23.

The recess 23 prevents vertical movement of the hook 4 with respect to the eyelet 21, but at the same time permits the device to be swung in a vertical plane. This feature is clearly shown in Figures 1 and 4. The positions of the eyelet 21 and the windshield 20 are different with each car. In some cases, the eyelet 21 is disposed in back of the windshield, in others, in alinement with the windshield, and in others, in front of the shield. In Figure 4, I have illustrated one of these positions, the eyelet in this instance being disposed in front of the shield. The opposite walls 25 of the recess 23 are curved so as to permit the device to swing with respect to the eyelet 21, and at the same time to prevent any vertical movement of the hook 4. It will therefore be apparent that the device may be readily applied to the car no matter where the eyelet 21 is disposed with respect to the windshield 20.

I claim:

1. A device of the type described comprising a casing, a hook rigidly secured to one end of said casing, a sleeve carried by the other end of said casing, a bolt slidably disposed in said sleeve, a nut disposed on said bolt and being slidably received in said casing, a spring disposed between said nut and said sleeve, said nut being adapted to engage with the inner end of said hook to prevent the rotation of said nut with respect to said hook, a felt washer and a concave metal washer disposed between said spring and said sleeve.

2. The combination with an automobile having a top and a wind shield, an eyelet carried by said top, and a hook carried by said wind shield, of adjustable yielding means secured to said eyelet and said hook, said means comprising a casing having a hook rigidly secured thereto, said hook adapted to be carried by said eyelet, an L-shaped bolt slidably carried by said casing and having a laterally projecting portion adapted to be secured to said first named hook, whereby said bolt is prevented from rotation with respect to said hook, and a nut mounted on said bolt and being slidably carried by said casing, said nut being prevented from rotative movement with respect to said casing.

CLYDE W. SPAUGH.